(12) United States Patent
Wang et al.

(10) Patent No.: US 12,387,097 B2
(45) Date of Patent: Aug. 12, 2025

(54) EFFICIENT VIDEO PROCESSING VIA TEMPORAL PROGRESSIVE LEARNING

(71) Applicant: Lemon Inc., Grand Cayman (KY)

(72) Inventors: Peng Wang, Los Angleles, CA (US); Heng Wang, Los Angeles, CA (US); Xianhang Li, Los Angeles, CA (US); Xinyu Li, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 366 days.

(21) Appl. No.: 18/111,756

(22) Filed: Feb. 20, 2023

(65) Prior Publication Data

US 2023/0206067 A1 Jun. 29, 2023

(51) Int. Cl.
*G06N 3/08* (2023.01)
*G06N 3/0455* (2023.01)
*G06V 10/75* (2022.01)
*G06V 10/77* (2022.01)
*G06V 10/771* (2022.01)
*G06V 10/82* (2022.01)
*G06V 20/40* (2022.01)

(52) U.S. Cl.
CPC ............. *G06N 3/08* (2013.01); *G06N 3/0455* (2023.01); *G06V 10/751* (2022.01); *G06V 10/771* (2022.01); *G06V 10/7715* (2022.01); *G06V 10/82* (2022.01); *G06V 20/46* (2022.01)

(58) Field of Classification Search
CPC ...... G06N 3/08; G06N 3/0455; G06N 3/0985; G06N 3/088; G06N 3/0464; G06N 3/0895; G06N 3/045; G06N 3/084; G06N 3/047; G06N 3/044; G06N 3/09; G06N 3/0475; G06V 10/751; G06V 10/771; G06V 10/7715; G06V 10/82; G06V 20/46; G06V 20/40; G06V 20/41; G06V 10/774; G06V 10/454; G06V 10/764; G06V 10/62; G06T 2207/20081; G06T 2207/20084; G06T 2207/10016; G06T 5/50; G06T 7/0012; G06T 2207/20016; G06T 2207/20221

See application file for complete search history.

(56) References Cited

U.S. PATENT DOCUMENTS

| | | | |
|---|---|---|---|
| 11,238,093 B2 * | 2/2022 | Ayush | G06F 16/783 |
| 11,386,680 B2 * | 7/2022 | Maity | G06V 20/584 |
| 11,967,121 B2 * | 4/2024 | Takagi | H04N 19/103 |
| 12,045,728 B2 * | 7/2024 | Ketyko | G06N 20/00 |
| 2018/0174050 A1 * | 6/2018 | Holt | G06N 3/084 |

(Continued)

*Primary Examiner* — Michael S Osinski

(57) ABSTRACT

Systems and methods for performing temporal progressive learning for video processing are provided herein. Some examples include receiving a video that includes a plurality of frames, extracting a first subset of frames from the plurality of frames, and inputting the first subset of frames into a model that includes an encoder and a decoder. The examples further include comparing a first output of the model to the first subset of frames and updating the encoder, thereby training the encoder, and extracting a second subset of frames from the plurality of frames. The second subset of frames includes a number of frames that is larger than a number of frames in the first subset of frames. The examples further include inputting the second subset of frames into the model, comparing a second output of the model to the second subset of frames and updating the encoder, thereby further training the encoder.

20 Claims, 19 Drawing Sheets

(56) References Cited

U.S. PATENT DOCUMENTS

| | | | | |
|---|---|---|---|---|
| 2019/0108399 A1* | 4/2019 | Escorcia | G06F 18/24 |
| 2020/0342643 A1* | 10/2020 | Gouws | G06T 11/60 |
| 2021/0004677 A1* | 1/2021 | Menick | G06N 20/20 |
| 2021/0081673 A1* | 3/2021 | Lai | G06V 20/41 |
| 2021/0201460 A1* | 7/2021 | Gong | G06N 3/045 |
| 2021/0295160 A1* | 9/2021 | Park | G06N 3/063 |
| 2021/0303935 A1* | 9/2021 | Ma | G06V 10/82 |
| 2022/0108136 A1* | 4/2022 | Son | G06F 18/2193 |
| 2022/0156584 A1* | 5/2022 | Fersch | G10L 19/00 |
| 2022/0180189 A1* | 6/2022 | Adrian | G06N 3/047 |
| 2022/0180199 A1* | 6/2022 | Xu | G06V 10/82 |
| 2022/0245932 A1* | 8/2022 | Gauerhof | G06V 10/764 |
| 2022/0309342 A1* | 9/2022 | Borgohain | G06N 3/047 |
| 2023/0005251 A1* | 1/2023 | Take | G06V 10/82 |
| 2023/0046066 A1* | 2/2023 | Bulat | G06V 10/7715 |
| 2023/0061517 A1* | 3/2023 | Yang | G06V 10/774 |
| 2023/0082050 A1* | 3/2023 | Li | G06T 11/001 |
| 2023/0177639 A1* | 6/2023 | Chee | G06T 5/50 382/100 |
| 2023/0262237 A1* | 8/2023 | Mitra | H04N 19/176 |
| 2023/0274527 A1* | 8/2023 | Chen | G06F 18/214 382/181 |
| 2023/0298219 A1* | 9/2023 | Galpin | H04N 19/61 382/232 |
| 2023/0368520 A1* | 11/2023 | Goldin | G06V 10/774 |
| 2023/0412796 A1* | 12/2023 | Liu | H04N 19/85 |
| 2024/0064318 A1* | 2/2024 | Letunovskiy | H04N 19/42 |
| 2024/0095878 A1* | 3/2024 | Chen | G06T 3/40 |
| 2024/0127794 A1* | 4/2024 | Seo | G10L 15/063 |
| 2024/0161445 A1* | 5/2024 | Fujiwaka | H04N 19/136 |
| 2024/0203123 A1* | 6/2024 | Dimitriou | G06F 18/2148 |
| 2024/0220856 A1* | 7/2024 | Schreiber | G06N 3/084 |
| 2024/0267542 A1* | 8/2024 | Henry | H04N 19/00 |
| 2024/0273944 A1* | 8/2024 | Chen | G06V 10/764 |
| 2024/0312208 A1* | 9/2024 | Ghosh | G06V 10/7715 |
| 2024/0320971 A1* | 9/2024 | Thumpudi | G06V 20/40 |
| 2024/0338572 A1* | 10/2024 | Gillian | G06N 3/0895 |
| 2025/0046071 A1* | 2/2025 | Goldin | G06V 10/82 |
| 2025/0086471 A1* | 3/2025 | Bubeck | G06N 3/091 |
| 2025/0104210 A1* | 3/2025 | Pu | G03F 7/706841 |
| 2025/0118434 A1* | 4/2025 | Lee | G16H 50/20 |

* cited by examiner

| Pre-Train Method | Pre-Train Epoch | ViT-B | | ViT-L | |
|---|---|---|---|---|---|
| | | Training TFlops | Top1 | Training TFlops | Top1 |
| VideoMAE | 200 | 7.10 | 78.4 | 16.62 | 81.5 |
| VideoMAE | 400 | 14.20 | 79.4 | 33.24 | 83.4 |
| VideoMAE | 800 | 28.40 | 80.7 | 66.49 | 84.2 |
| VideoMAE | 1600 | 56.80 | 81.5 | 132.98 | 84.7 |
| TP-MAE | 200 | 6.22 | 79.7 | 15.38 | 83.3 |
| TP-MAE | 400 | 12.44 | 80.6 | 30.76 | 84.3 |
| TP-MAE | 800 | 24.88 | 81.2 | 61.50 | 84.7 |
| TP-MAE | 1600 | 53.28 | 81.4 | 128.00 | 85.2 |

| Method | Source data | Target | Top1 Acc. |
|---|---|---|---|
| ImageMAE | ImageNet-1k | pixel | 64.5 |
| VideoMAE | SS-V2 | pixel | 67.9 |
| MotionMAE | SS-V2 | RGB-diff.+pixel | 68.4 |
| MAM$^2$ | SS-V2 | RGB-diff.+token | 69.0 |
| M$^3$Video | SS-V2 | trajectory | 69.2 |
| TP-MAE | SS-V2 | pixel | 69.4 |

FIG. 4

| 2-f | 4-f | 8-f | 16-f | Training Flops | SS-V2 |
|---|---|---|---|---|---|
| 0 | 0 | 0 | 100% | 35.5G | 68.4 |
| 12.5% | 6.25% | 6.25% | 75% | 34.0G | 69.2 |
| 12.5% | 6.25% | 31.25% | 50% | 33.0G | 69.0 |
| 12.5% | 12.5% | 50% | 25% | 31.9G | 69.4 |
| 12.5% | 25% | 50% | 12.5% | 31.1G | 69.4 |
| 25% | 31.25% | 31.25% | 12.5% | 30.7G | 69.3 |
| 50% | 25% | 12.5% | 12.5% | 30.3G | 68.7 |
| 75% | 6.25% | 6.25% | 12.5% | 29.4G | 68.2 |
| 100% | 0% | 0% | 0% | 28.8G | 66.7 |

FIG. 5

| Training Method | Backbone | Pre-train on | param. | GFlops | input size | SSV2 | K400 |
|---|---|---|---|---|---|---|---|
| supervised | Slowfast | K400 | 53M | 106 | $32\times224^2$ | 63.1 | 79.8 |
| supervised | MViT-B | K400 | 37M | 455 | $64\times224^2$ | 67.7 | 81.2 |
| supervised | MViTv2-B | K400 | 51M | 225 | $32\times224^2$ | 70.5 | 82.9 |
| supervised | MotionFormer | IN-21K+K400 | 109M | 370 | $32\times224^2$ | 66.5 | 80.2 |
| supervised | Swin-B | IN-21K+K400 | 88M | 321 | $32\times224^2$ | 69.6 | 81.1 |
| supervised | TimeSformer | IN21K | 430M | 5549 | $64\times224^2$ | 62.4 | 80.7 |
| BEVT | Swin-B | IN-1K+K400+DALLE | 88M | 282 | $32\times224^2$ | 70.6 | 81.1 |
| VideoMAE | ViT-B | K400 | 87M | 180 | $16\times224^2$ | 69.7 | 81.5 |
| ST-MAE | ViT-B | K400 | 304M | 598 | $16\times224^2$ | N/A | 81.3 |
| TP-MAE | ViT-B | K400 | 87M | 180 | $16\times224^2$ | 69.9 | 81.4 |
| MaskFeat | MViTv2-L | K400 | 218M | 2828 | $40\times224^2$ | 74.4 | 84.3 |
| VideoMAE | ViT-L | K400 | 304M | 598 | $16\times224^2$ | 74.0 | 84.7 |
| ST-MAE | ViT-L | K400 | 304M | 598 | $16\times224^2$ | 72.1 | 84.8 |
| TP-MAE | ViT-L | K400 | 304M | 598 | $16\times224^2$ | 74.2 | 85.2 |
| ST-MAE | ViT-H | K400 | 632M | 1193 | $16\times224^2$ | 74.1 | 85.1 |
| TP-MAE | ViT-H | K400 | 632M | 1193 | $16\times224^2$ | 74.7 | 85.5 |

FIG. 6

| # of learning rate cycles | decay type | Top-1 |
|---|---|---|
| 1 | cosine | 68.7 |
| 2 | cosine | 69.1 |
| 4 | cosine | 69.4 |
| 4 | step | 68.3 |

| 2-f | 4-f | 8-f | 16-f | speedup | Top-1 |
|---|---|---|---|---|---|
| 8 | 8 | 8 | 16 | ×1.0 | 69.4 |
| 16 | 16 | 16 | 16 | ×2.0 | 69.4 |
| 32 | 32 | 32 | 16 | ×2.3 | 69.1 |
| 64 | 64 | 64 | 16 | ×2.4 | 68.8 |

1000

| # of stages | # of frames per stage | Top-1 |
|---|---|---|
| 1 | 16×s | 68.4 |
| 2 | (2, 16)×s | 69.0 |
| 3 | (2, 4, 16)×s | 69.1 |
| 3 | (2, 8, 16)×s | 69.2 |
| 3 | (4, 8, 16)×s | 69.0 |
| 4 | (2, 4, 8, 16)×s | 69.4 |
| 5 | (2, 4, 8, 12, 16)×s | 69.1 |

1100

| # of temporal resolution per stage | sampling order | Top-1 |
|---|---|---|
| 1 | (2 → 4 → 8 → 16) | 69.4 |
| 4 | | 68.8 |
| 1 | Randomly sampling | 68.9 |
| 4 | | 68.4 |

1200

EFFICIENT VIDEO PROCESSING VIA TEMPORAL PROGRESSIVE LEARNING

BACKGROUND

With an ever-growing capacity of a model and size of data, large-scale pre-training is gradually becoming a standard paradigm for machine learning algorithms, such as deep neural networks, in a computer vision domain. Masked-auto-encoder (MAE) on image and video are among top trending self-supervised methods due to their robustness, simplicity and effectiveness. Nevertheless, training videoMAEs is slow and costly. For example, it may take over five days and 64 graphical processing units (GPUs) to train a videoMAE model on a conventional dataset, which hinders videoMAE's accessibility for users with limited computational budgets, as well as limiting scaling thereof to larger datasets.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to methods, systems, and media for performing temporal progressive learning for video processing.

In some examples, a method of performing temporal progressive learning for video processing is provided. The method includes: receiving a video stream that includes a plurality of frames; extracting a first subset of frames from the plurality of frames; inputting the first subset of frames into a model, wherein the model includes an encoder and a decoder; comparing a first output of the model to the first subset of frames and updating the encoder based on the comparison, thereby training the encoder; extracting a second subset of frames from the plurality of frames, the second subset of frames includes a number of frames that is larger than a number of frames in the first subset of frames; inputting the second subset of frames into the model; comparing a second output of the model to the second subset of frames and updating the encoder based on the comparison, thereby further training the encoder; and providing the encoder.

In some examples, the model is a masked auto encoder (MAE) model.

In some examples, each frame in the first and second subsets of frames are randomly masked, prior to being input into the MAE model.

In some examples, the first and second subsets of frames are randomly selected from the plurality of frames.

In some examples, the second subset of frames includes twice as many frames as the first subset of frames.

Some examples further include, prior to providing the model: extracting a third subset of frames from the plurality of frames, the third subset of frames being randomly selected from the plurality of frames and including a number of frames that is larger than the number of frames in the second subset of frames; inputting the third subset of frames into the model; and comparing a third output of the model to the third subset of frames and updating the encoder based on the comparison, thereby further training the encoder.

In some examples, the third subset of frames includes twice as many frames as the second subset of frames.

In some examples, each sequence of the extracting, the inputting, and the comparing define a respective stage, and wherein the number of frames extracted in the subset of frames for each stage are determined based on a total number of stages and a computational budget.

In some examples a system for performing temporal progressive learning for video processing is provided. The system includes a processor and memory storing instructions that, when executed by the processor, cause the system to perform a set of operations. The set of operations include one or more aspects of the examples provided herein.

In some examples, one or more computer readable non-transitory storage media are provided. The one or more computer readable non-transitory storage media embody software that is operable when executed, by at least one processor of a device, to perform a set of operations. The set of operations include one or more aspects of the examples provided herein.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

FIG. 4 illustrates a table comparing video processing techniques, according to some aspects described herein.

FIG. 5 illustrates a table of ablations on allocating computation, according to some aspects described herein.

FIG. 6 illustrates a table comparing mechanisms provided herein to previous techniques, according to some aspects described herein.

DETAILED DESCRIPTION

Figure 1:
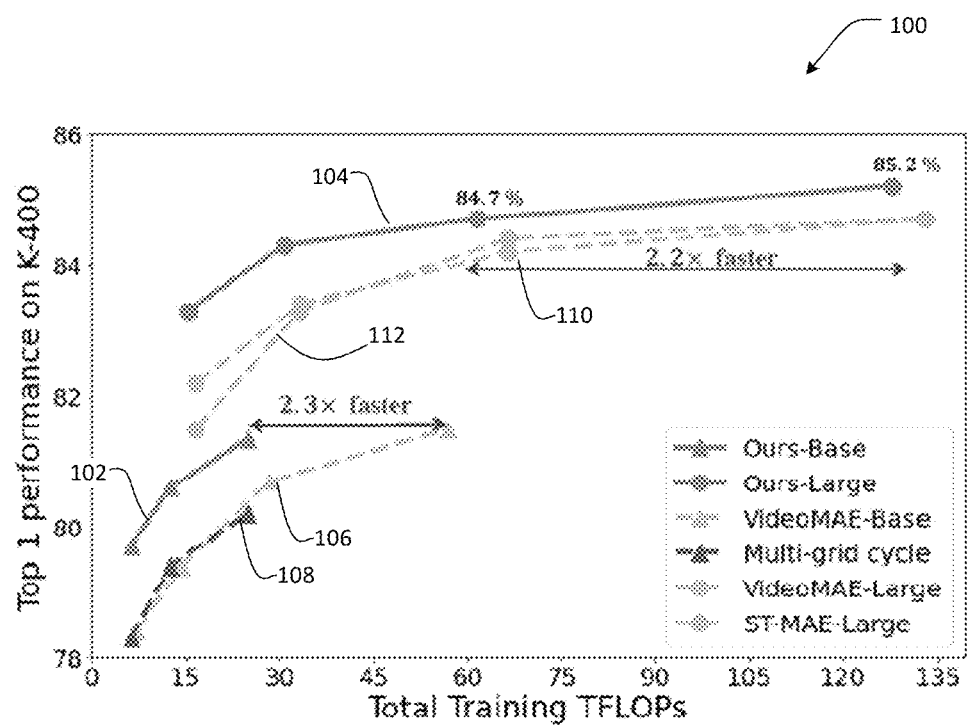
FIG. 1 illustrates an accuracy/training cost trade-off curve according to some aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Recently masked autoencoders (MAE) have been successfully extended from image domain to video, and achieved the state-of-the-art results for video recognition via self-supervised pre-training. Though VideoMAE pre-training can lead to higher accuracy, they often require to be trained with large GPU clusters for relatively large durations of time. Such computational resources are often inaccessible to users (e.g., corporations or researchers) and can results in a relatively large energy consumption as well. Mechanisms disclosed herein improve the efficiency of VideoMAE, especially under a limited computational budget. Early video transformers often rely on first pre-training on large image datasets to alleviate optimization difficulties. In some examples provided herein VideoMAE benefits from learning spatial semantic information first, then gradually transitioning to learn temporal information. Such examples may include a Temporal Progressive Learning (TPL) strategy, where video transformers are exposed to progressively longer clips, in contrast to existing methods where the models are forced to learn spatial and temporal information jointly from scratch. By decomposing long clip reconstruction tasks into smaller sub-tasks, TPL is able to divide and conquer each sub-task step by step, and significantly speed up pre-training.

Through extensive experiments, mechanisms provided herein can save the computational cost of VideoMAE up to 2× on certain conventional datasets (e.g., Kinetics-400) and/or 3× on certain conventional datasets (e.g., Something-Something V2). When relatively more computational resources are available, TPL can outperform current VideoMAE consistently on certain conventional datasets (e.g., Kinetics-400, Something-Something V2). For instance, some systems constructed in accordance with mechanisms provided herein achieve 85.5% on Kinetics-400 and 74.7% on Something-Something V2 that outperforms previous methods by 0.4% and 0.6%.

As mentioned above, with an ever-growing capacity of a model and size of data, large-scale pre-training is gradually becoming a standard paradigm for machine learning algorithms, such as deep neural networks, in a computer vision domain. Masked-auto-encoder (MAE) on image and video are among top trending self-supervised methods due to their robustness, simplicity and effectiveness. Nevertheless, training videoMAEs is slow and costly. For example, it may take over five days and 64 graphical processing units (GPUs) to train a videoMAE model on a conventional dataset (e.g., Kinetics 400), which hinders videoMAE's accessibility for users with limited computational budgets, as well as limiting scaling thereof to larger datasets.

Therefore, it is valuable to explore strategies in order to significantly reducing their training cost. To make model learn faster, some mechanisms provided herein select more informative/important examples while avoiding redundant ones during a training process, as demonstrated in learning with images. In the case of VideoMAE, directly using joint spatio-temporal examples, i.e. cuboid-like examples, may be less efficient since a video patch clip can be computational costly to encode, while mostly containing a large amount of redundant information temporally.

Based on such an intuition, mechanisms provided herein include a progressive learning strategy by separating a learning process from a more informative-dense while low-cost spatio training to a more costly temporal training.

FIG. 0.1 illustrates an accuracy/training cost trade-off curve on a Kinetics-400 dataset with ViT model series. Each point on the curve corresponds to a model pre-trained with a specific training budget, and the illustration include fully fine-tuning results. The temporal progressive learning framework described in accordance with mechanisms provided herein achieves a preferable trade-off between efficiency and performance, such as is shown via the "Ours-Base" and "Ours-Large" curves.

FIG. 1 illustrates an example accuracy/training cost trade-off plot 100 according to some aspects described herein. The x-axis of the plot 100 is total training floating point operations per second (TFLOPs). The y-axis of the plot 100 is a performance on a conventional dataset (e.g., K-400), as measured in percentage. Each point on the plot 100 corresponds to a model pre-trained with a specific training budget.

A first curve 102 corresponds to first model pre-trained on a base data set using techniques provided herein. A second curve 104 correspond to a second model pre-trained on a large data set using techniques provided herein. A third curve 106 corresponds to a third model pre-trained on the base data set using conventional techniques. A fourth curve 108 correspond to a fourth model pre-trained using conventional techniques. A fifth curve 110 corresponds to a fifth model pre-trained on the large data set using conventional techniques. A sixth curve 112 corresponds to a sixth model pre-trained on the large data set using conventional techniques.

As show in FIG. 1, mechanisms provided herein (e.g., illustrated by the first curve 102 and the second curve 104) are relatively more efficient than VideoMAE (e.g., illustrated by the third curve 106) by saving the training cost ~2× when reaching its state-of-the-art (SoTA) accuracy (84.7%). In addition, after providing more training budgets, mechanisms provided herein out-perform VideoMAE yielding new SoTA for the training model.

Specifically, mechanisms provided herein include temporal progressive learning (TPL), to enable efficient and effective videoMAE training. TPL is a multi-stage training framework, where mechanisms provided herein start video-MAE training with a single frame for spatial semantics learning. Then mechanisms progressively increase the clip temporal length at each training stage, and finally the model learns the full spatio-temporal representations. To achieve the best efficiency/effectiveness trade-off using TPL, there may be various design choices which can be non-trivial to set, such as a number of learning stages ($n_s$), number of learning frames of $i_{th}$ stage ($f_i$), portion of training budget assigned for $i_{th}$ stage ($p_i$), learning rate and optimizer ($lr_i$, $op_i$) etc. Notice all these variables are non-differentiable, and optimizing different weights and/or values for the variables may be configurable by a user depending on specific use cases. In some examples, optimizing the different weights and/or values can be performed with an efficient grid search, where the searched design can be generalized to different datasets and/or architectures. Mechanisms provided herein may be advantageous over a multi-grid strategy for supervised learning, which has a cyclic strategy not as effective as TPL for videoMAE, as shown in FIG. 1.

Extensive experiments have been conducted, based on mechanisms provided herein, on something-Something-V2 and Kinetics-400. The results (see FIG. 1) show that the TPL achieves SOTA performance previously established by with 2× less epochs or units of time, demonstrating the excellent efficiency of proposed methods. Under same training budget, e.g. 1600 epochs or units of time, the proposed TPL is able to outperform by 0.5%, which show case the effectiveness of temporal progressive learning. Advantageous advancements disclosed herein include:

1) A temporal progressive learning framework (TPL) that speeds up VideoMAE training by up to 3× with better performance. The TPL generalizes well to various backbones with different sizes and types, which makes it generally applicable. 2) Instantiations of TPL for MAE training under different budget at various scales. 3) State-of-the-art (SOTA) results on two large-scale datasets, as well as detailed ablations.

Some examples for video processing relate to mask autoencoders. Some mask autoencoding paradigms have recently achieved great success in both nature language processing (NLP) and computer vision. However, such paradigms fall short of mechanisms provided herein for improving pre-training efficiency.

Some examples for video processing relate to pre-training and fine-tuning for video classification. Pre-training and then fine-tuning can be a training strategy for video recognition. Some researcher devote effort to designing efficient video backbones driven by 2D image classification models. Adding video-specific design into 2D blocks or inserting 3D or attention-style block combines the advantages of image pre-trained model and delicate domain knowledge. There is also active research on designing pure 3D efficient convolutional neural network (CNN) back-bones. Recent work demonstrate 3D CNN can also benefit from image pre-training. Recently transformer achieves great progress in many tasks as well as video understanding. In these transformer-based works, large-scale image pre-trained weights are required for avoiding overfitting, However, the cost of training is often neglected. Mechanisms provided herein include implementing progressively spatiotemporal learning on self-supervised pre-training settings.

Some examples for video processing relate to spatiotemporal sampling for video. There is active research on designing effective sampling strategy for video understanding. However, mechanisms provided herein focus on revisiting MAE-based self-supervised pre-training methods through a spatiotemporal sampling perspective instead of proposing a novel sampling strategy.

In some examples provided herein, a method for efficient video processing is disclosed. First, discussed herein is Image-MAE and VideoMAE as preliminaries. Next, discussed herein is a framework of temporal progressively learning (TPL) with its formulation. Further, discussed herein is an explanation of how to find an optimal training configuration that consider both efficiency and effectiveness for mechanisms provided herein.

Some examples for video processing (e.g., ImageMAE) include an asymmetric encoder-decoder architecture that includes a masking-then-predicting paradigm for doing unsupervised learning for image representations. Such examples may randomly masks out 75% of grid patches for reconstruction. Such a strategy is soon widely adopted due to its simplicity and effectiveness. Some examples for video processing generalize the strategy to the video recognition domain by masking in a video clip where 90% of grid cuboids are removed for reconstruction.

The training process of VideoMAE with transformer is as follows. First, given a raw video $X \in R^{C \times T \times H \times W}$ with its spatio-temporal resolution as T×H×W and input image channel as C, a temporal downsampling is performed of X with a factor of τ, yielding a low-fps video $X' \in R^{C \times T/\tau \times H \times W}$.

At each step of training, inside the X', mechanisms randomly sample B video clips as a training batch. And each clip contains t frames with a spatial resolution of h×w, where h and w are the spatial resolution after pre-processing of random resizing and cropping. This yields an encoder input x of VideoMAE with the size of B×C×t×h×w.

Then, the network first does a cube embedding operation with a non-overlapping 3d convolution with size of $s_t \times s_h \times s_w$, which transforms x into tokens t as input of $$B \times C_p \times \left( \frac{t}{s_t} \times \frac{h}{s_h} \times \frac{w}{s_w} \right),$$

transformer. After the transformation, t has the size of where $C_p$ is the embedding dimension, $s_t$, $s_h$, $s_w$ is the temporal and spatial downsampling stride. Here, in some examples, h=w and $s_h = s_w$, therefore, the spatial dimension can be denoted with $$p = \frac{h}{s_h} \text{ and } t' = \frac{t}{s_t}$$

for simplicity.

Finally, a tube mask operation may be performed, which first masks a large portion of tokens from t at the spatial dimension of p×p, and then propagates the same mask to other frames across t'. After the masking, the encoder may process the sampled visible tokens with the size of B×Cp×(t'×p×p×ρ), where ρ is the sampling rate (e.g. 10% in VideoMAE). Then decoder may duplicate a mask token which can fill the unseen token in the corresponding position. So the output of decoder has the same size B×C×t×h×w as the input. At last, a mean squared error (MSE) loss may be applied to guide the training, and after the training, the learnt weights can be used as input for downstream tasks, such as video classification. Next will be discussed how TPL helps to accelerate this process.

Mechanisms disclosed herein provide an optimal training process that reduces the training cost for visual processing, and it is hypothesized that models (e.g., visual processing models) will learn much faster if they progressively learn from spatial to temporal. This hypothesis is based on the fact that reconstructing a single image is much more efficient than a video (e.g., 3.5G vs 35.5G base on ViT).

Figure 7:
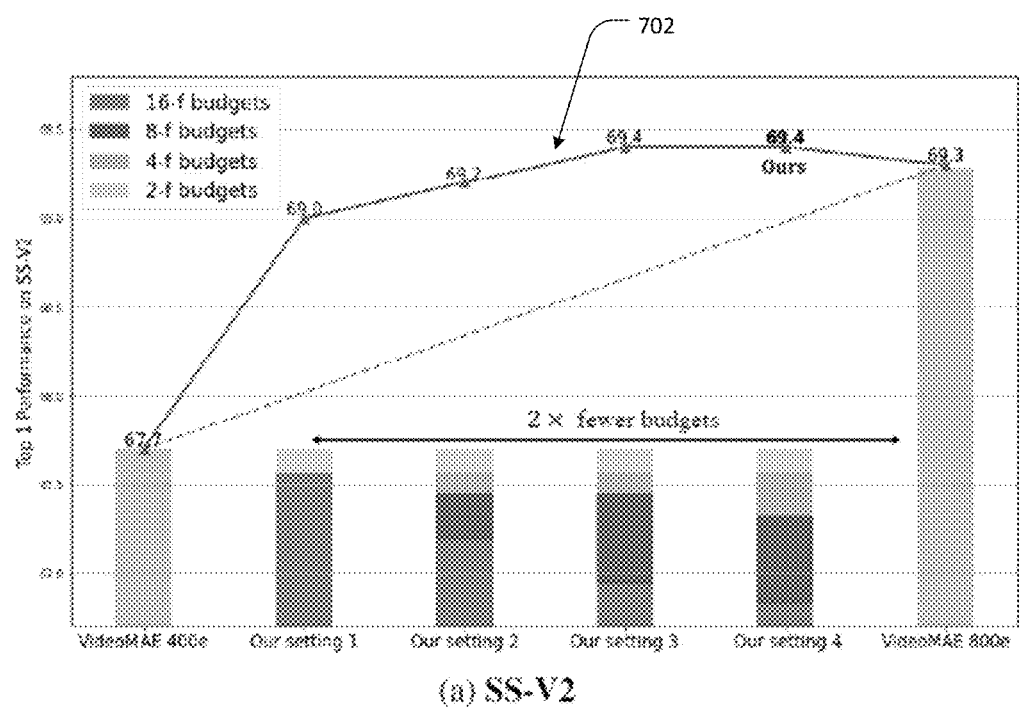
FIG. 7 illustrates an example of search to allocate budgets, according to some aspects described herein.
Figure 8:
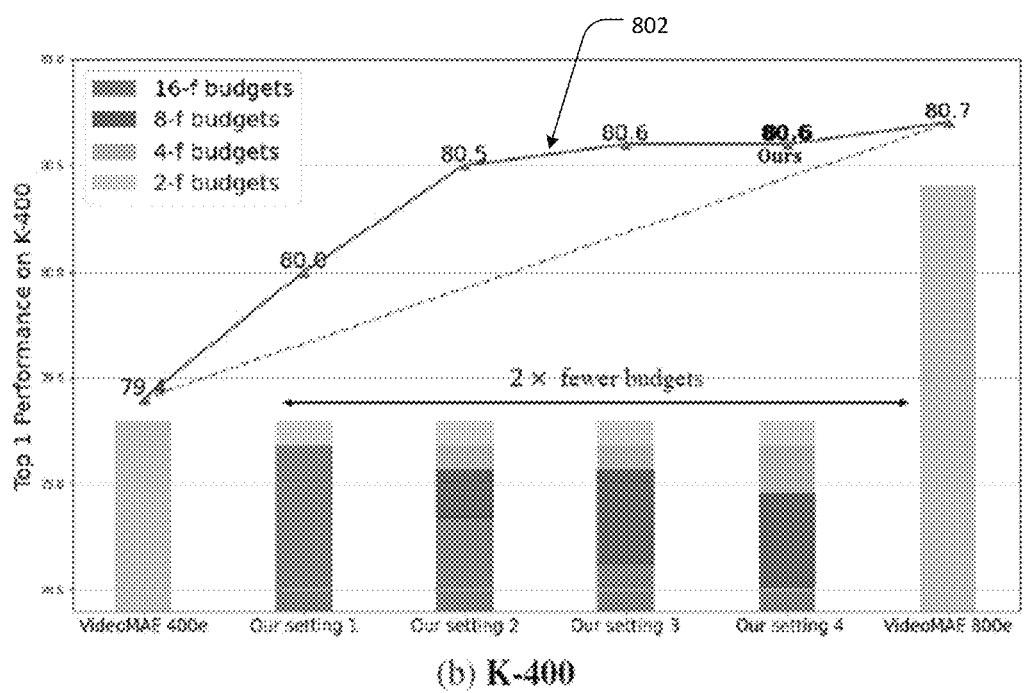
FIG. 8 illustrates an example of search to allocate budgets, according to some aspects described herein.

Formally, given a dataset $\{Xi\}^N_i$, optimizing the tradeoff curve of training budgets and accuracy A (as illustrated in FIGS. 7 and 8), may be equivalent to finding an optimal temporal progressive configuration C under any given budget β, which can be formulated as:

$$\max_C A_{val}(\theta*(C))$$

$$\text{s.t. } \theta*(C) = \arg f_\theta L_{train}(\theta \mid \theta(C)),$$

$$\theta(C) = \arg f_\theta L_{TPL}(\theta \mid C),$$

$$\Phi_{TPL}(f_0, C) \leq \beta$$

where $A_{val}$ is the validation accuracy. $\theta*(C)$ is the parameters of the network finetuned with the supervised video loss. $\theta(C)$ is the initial weight trained with our TPL Video-MAE under configuration C. $\Phi_{TPL}(\ )$ is the computation training cost given the network and configuration. This formulates the standard pipeline as commonly used in those popular pretrain and finetune settings. With the definition, a goal is to find a configuration C such that the accuracy on validation is maximized.

Next, all variables in C of TPL are defined that are needed to be searched to optimize. First, a number of progressive stages $n_s$ may be considered, and inside each stage i, the number of frames that need to sample $f_i$ may be specified. In some examples, it may further be specified what portion of resource $p_i$ need to be allocated. Since mechanisms provided herein may due the learning progressively, an additional constraint for C is, $$\forall i, f_i+1 > f_i \text{ when } n_s > 1,$$

After these meta configurations are specified, to reach optimal performance, good inner recipes may be found at each stage by configuring proper batch size $bz_i$, learning rate $lr_i$, etc. In summary, a training configuration in TPL can be defined as $C=\{f_i, p_i, R_i\}^{ns}_i$, where $R_i=\{bz_i, lr_i\}$. It is noted that while two training parameters for $R_i$ are specified, there may be others, and searching other ones can follow similar paradigm.

Under the definition, the configuration C of Video-MAE can be instantiated as $\{f_0=16, p_0=1, \{bz_0=16, lr_0=0.01\}\}$, where all budget is used with 8 group of sampled frames (16 in total), which can serve as a baseline. On the other hand, a typical TPL pipeline with C of multiple stages is illustrated in FIG. 2.

Figure 2:
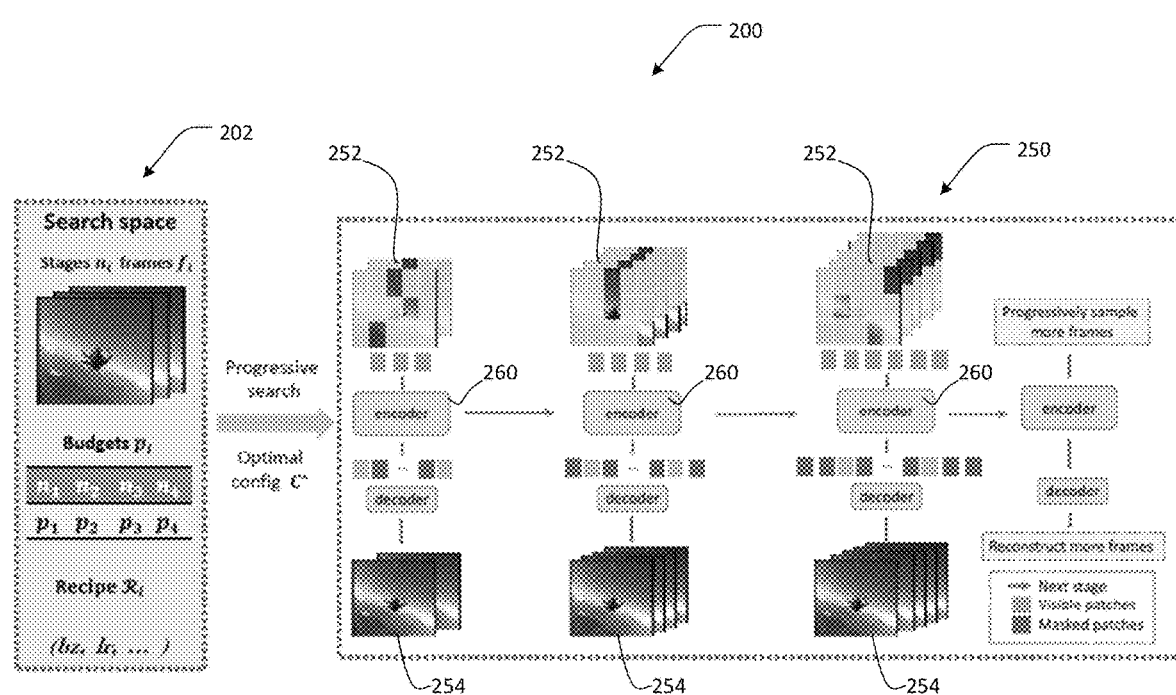
FIG. 2 illustrates an overview of a temporal progressive learning (TPL) pipeline according to some aspects described herein.

FIG. 2 illustrates an example overview 200 of a temporal progressive learning (TPL) pipeline. The example overview 200 is a multi-stage video processing (e.g., VideoMAE) training framework. First, a search space 202 may be setup for finding an optimal configuration C of TPL, which may then be applied in TPL training 250. The search space 202 includes one or more stages $n_i$, one or more frames $f_i$, one or more budgets $p_i$, and one or more recipes $R_i$.

The TPL training 250 includes providing a sampling 252 of one or more frames 254 to a model (e.g., including an encoder 260 and a decoder 262) to reconstruct the one or more frames 254. In the TPL training 250, the sampling 252 progressively includes more frames at each stage of the TPL training 250.

It is noted that in some examples the objective is a multi-level hyperparameter optimization problem, and it is implausible to direct differentiate the objective accuracy to the defined variables in C. One may follow hyperparameter search strategies. However, in VideoMAE, one training of a configuration is still too costly to perform the search. Therefore, mechanisms provided herein follow a progressive heuristic in a greedy manner, which starts with searching a number of stages $n_s$, and then in each stage, sampling a number of frames to train $f_i$, and finally determining a portion of computation budget $p_i$ to allocate across different stages.

After the meta configuration is set, mechanisms provided herein do an inner search of the training optimizer recipes by changing batch size and learning rate based on the unsupervised training loss. In the following, an example is specified of how to define a search space and do experiments.

Since TPL learn with a temporal progressive manner, mechanisms provided herein may start enumerating $n_s$ from small to large up to a largest stage number. Specifically, the search space for $n_s$ may be S=\{1, 2, 3, 4\}. For $f_i$ mechanisms may do a conditional sampling from F=\{2, 4, 8, 12, 16\} with the constraint specified in $\forall i, f_i+1 > f_i$ when $n_s > 1$. The sample space off may be designed to be even because a common network doing video encoding may come with a temporal stride $s_t$ of 2. Note that here the smaller $f_i$ sampled in a stage may indicate a stronger bias to learning spatial semantics and vice versa. In total, the number of stage-frame configurations can be computed with combinatorics as $$\sum_{1 \leq i \leq |F|} \binom{|F|}{i}.$$

In practice, many configurations are may be easy to prune with heuristic to save the searching cost, which may be adopted to achieve a close solution to optimal. For example, in experiments discussed later herein, when a budget is relatively large (e.g., as large as VideoMAE), single stage may not be searched with fewer frames.

In this section is discussed how to allocate training budgets for each stage given β. Here, the budget may be $\beta=N_f\Phi(f_\theta)$, which is the flops after processing $N_f$ video frames, and $\Phi(f_\theta)$ is the flops of network $f_\theta$ processing a single frame. For training a model, $N_f=N_{ei} \times N_d \times f_i$, where $N_{ei}$ is the number of epochs (e.g., units of time), and $N_d$ is the size of dataset. Given the formula, the training epochs can be easily estimated given $f_i$ and allocated budget $p_i$.

Since the budget is dynamically floating, for simplicity, it may be assigned based on certain portion. Specifically, the search space for the portion at each stage may be set as $p_i \in \{0, 1/16, 1/8, 1/4, 1/2, 1\}$ with the constraint that $\Sigma_i p_i=1$. In practice, the budget portion of $i+1_{th}$ stages may be progressively sampled by selecting with a constraint as $p_{i+1} \leq 1 - \Sigma_{i \in [1, i-1]} p_i$.

Finally, mechanisms provided herein may easily transfer the allocated budget to number of epochs by $(p_i N_f)/(N_d f_i)$. For instance, for VideoMAE with $f_i=16$ and $N_e=800$ epoch training budget, if settings include $p_i=1/4$ to with $f_i=2$, then setting may further include $N_{ei}=(16*800*1/4)/2=1600$ epochs to facilitate the setting of a training configuration.

For each stage, after a computation budget is fixed, one issue may be making sure the knowledge learned in a previous stage can be smoothly transferred to the next stage. Fortunately, thanks to transformer architecture, which accepts dynamic length of inputs without modifying the parameters, it is free to adjust input size of tokens across different learning stages.

Here, two parameters considered to be important to adjust are $bz_i$ and $lr_i$. One reason is that in a stage, the temporal frame number $f_i$ is reduced, and mechanisms may able to increase the $bz_i$ to further reduce the wall-clock gpu hours.

For batch size per-gpu, a search space may be established as $\{\min(2^j, bz_{mi})\}_{j=3}^6$ where $bz_{mi}$ is the maximum possible batch size computed base on $f_i$ and the GPU memory. Then, for searching with the space, a batch size number may be sampled from small to large to locate an optimal value.

For learning rate $lr_i$ used in each stage, two mechanisms are considered. Here, let $lr_0$ be the base learning rate that is used in VideoMAE. With the first mechanism, mechanisms provided herein may set $lr_i = s_{bz} \times lr_0$ following the scaling law, where $s_{bz} = bz_i/bz_0$, and $bz_0$ is the base batch size of VideoMAE. In the second mechanism, a single learning rate scheduler may be used across all stages. In other words, mechanisms provided herein may set the lr in first stage, i.e. $lr_1$, to be $lr_0$, and let the scheduler consider an epoch number to be the sum of epochs across all stages, i.e. $\Sigma_i N_{ei}$. In conclusion, in all cases, a user may find that the first mechanism always outperforms the second given the same setting on other configurations. Hence, the first mechanisms was used across example experiments provided herein. It is hypothesized that when a temporal frame changes, a corresponding feature representation should be changed accordingly. Therefore, a learning rate should be raised to original to better learn the representation.

Mechanisms provided herein may be scaled across various budgets (e.g., computational training budgets). Following the training setup discussed earlier herein, and as elaborated on in conjunction with the example experiments provided later herein, a searched configuration C on Kinectis-400 and Something-Something V2 datasets under the 400-epoch pre-training budgets, i.e. $N_f$=400×16, significantly outperforms its SoTA counterpart used in VideoMAE. In addition, when asking for a configuration with larger amount of budgets, e.g. 800/1600 total epochs, instead of redoing all the searching, similar to architecture scaling, mechanisms provided herein may simply scale the configuration based on the budget allocation p searched in 400 epochs by 2/4×. As shown in the example experiments, the extended configuration also outperforms the original configuration in VideoMAE, which demonstrates its effectiveness.

Lastly, TPL is a general strategy that is not limited to certain datasets or model architectures. A searched configuration may also be able to transfer across different transformer architectures and model sizes, which is discussed later herein.

Mechanisms provided herein have been evaluated on two large scale datasets, as examples: Kinetics-400 (K400) consists of around 260K raw videos with 400 action categories. On K400, a fixed-stride sampling strategy was adopted for both pre-training and fine-tuning following the common practice. Something-Something V2 (SS-V2) contains about 220K videos of 174 predefined human-object interactions with everyday objects. On SS-V2, segments-based sampling method is used for short video (i.e., 3 seconds per video). To conduct controlled experiments, all input frames have the same spatial resolution (224×224) by default. The temporal dimension t was only varied during pre-training for the examples provided herein.

In some examples, a AdamW optimizer is used with a weight decay of 0.05. In some examples, a cosine decay learning rate scheduler is adopted with an initial learning rate of 1.5e-4 and warmup epochs of 40 following. The same MultiScaleCrop, In some examples, RandomhorizontalFlip augmentation is used. Some examples include pre-training for 400 epochs and 1600 epochs for fixed budget experiments and full scale experiments respectively. A batch size of 1024 on 64 Tesla-V100 GPUs may be used for all pre-training tasks. In fine-tuning, a full-model fine-tune scheme may be adopted to establish fair comparison following. In testing, multi-crop multi-view protocol may be used. For fair comparison, 3 uniformly sampled spatial views for SSV2 dataset and 5 views for Kinetics dataset may be used, as examples.

Figure 3:
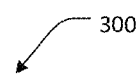
FIG. 3 illustrates a table comparing efficiency and effectiveness of video processing techniques, according to some aspects described herein.

FIG. 3 illustrates an example table 300 comparing efficiency and effectiveness of video processing techniques, according to some aspects described herein. Specifically, FIG. 3 illustrates TP-MAE (e.g., temporal progressive visual processing according to techniques provided herein) and VideoMAE (e.g., a conventional technique) trained with different backbones under various training budget. In the example table 300, both training FLOPs as well as evaluation top1 accuracy are reported. The proposed TPL consistently reduces MAE model training time while maintaining performance relatively uncompromised. For example, the TP-MAE reduce the videoMAE training epochs by 2× and FLOPs by 54% under 1600 epochs training scheduler, demonstrating superior performance and efficiency tradeoff. The TP-MAE also consistently reduce the training epochs by 2× with reduced training budgets, while maintaining up to 7.5% training FLOPs reduction comparing with video-MAE. The results also indicates that the proposed TPL generally lead to bigger impact to larger models with longer training scheduler. But it also generalize well to small backbones or shorter training scheduler, with noticeable speed boosting.

FIG. 3 also compares the TPL-MAE with other MAE models, at comparable FLOPs. The TP-MAE consistently outperforms other MAE models at different training budgets, e.g., under 1600 epochs setting, mechanisms provided herein improve the ViT-L model by 0.5% over the VideoMAE baseline. This demonstrates the effectiveness of proposed TPL. Similar performance boosts may also be observed under different computational budget, demonstrating that the proposed TPL is generally applicable to various application scenarios.

FIG. 4 illustrates an example table 400 comparing video processing techniques. Specially, the table 400 illustrates the videoMAE model trained with proposed TPL (e.g., the TP-MAE model trained according to mechanisms provided herein), compared to SOTA from literature, with respect to model performance and efficiency.

Some examples include pre-training the TP-MAE on kinetics-400 dataset for 1600 epochs for fair comparison. The TP-MAE consistently improves performance of videoMAE: +0.1% up on videoMAE-Base, +0.5% up on videoMAELarge and +0.4% up on videoMAE-Huge. This shows the proposed TPL is able to learn better spatio-temporal semantics. The TP-MAE also establishes new SOTA on Kinetics 400 with 74.7% top1 accuracy. The results demonstrates the effectiveness of proposed models in accordance with aspects described herein. Further, the RGB-diff in table 400 refers to temporal difference between frames.

Similar patterns may be observed from experiments on an SSV2 dataset. In some examples, the TP-MAE consistently improves performance of videoMAE: +0.2% up on videoMAE-Base, +0.2% up on videoMAE-Large and +0.6% up on ST-MAE-Huge. The consistent results on both large-scale datasets show that the proposed TPL generalize well to large-scale datasets and models of different size.

Some examples provided herein compare against other recently proposed MAEs on video domain. The TPMAE outperforms some conventional examples that integrate motion information by reconstructing trajectories or RGB per frame differential map. The superior performance demonstrates that the TPL helps spatio-temporal learning. More importantly, without introducing additional computational cost, our results shows only predicting pixels can also learn a better spatotemporal features, Progressive learning provided through aspects of the present disclosure can help models more efficiently (e.g., with respect to time and/or computational resources) learn temporal dynamics based on a well-established spatial-aware ability.

FIG. 5 illustrates an example table 500 of ablations on allocating computation. In the example table 500, training flops are measured by the averaging the model GFLOPs (floating-point operations, in # of multiply-adds×10⁹) via allocated training budgets. In some examples, ablations conducted on SS-V2. ViT-B may be used as a backbone and models may be pre-trained for 400 epochs and then fine-tuned for 30 epochs unless specifies. Similar training and fine-tuning configuration may be used as described earlier herein.

FIG. 6 illustrate an example table 600 comparing mechanisms provided herein to conventional techniques. The example mechanisms provided herein are embodied by the shaded rows that include the training method "TP-MAE." As will be recognized by those of ordinary skill in the art, the mechanisms provided herein provide advantageous results compared to conventional techniques.

FIGS. 7 and 8 illustrate example plots 700 and 800, respectively of search to allocate budgets. As shown in plots 700 and 800, mechanisms provided herein provide advantageous performance. Each bar in the plots 700 and 800 refer to one allocation setting. Each point in curve 702 and 802 represents the Top-1 performance under given training budgets. The first and last bar (e.g., along the x-axis), are baseline methods with VideoMAE.

FIGS. 7 and 8 illustrate the results of studying an efficiency and effectiveness trade-off with different training schedulers. Compared to the baseline (100% training computation on 16-f), assigning relatively more budget to early stages (spatial heavy reconstruction) leads to lower training FLOPs and faster training speed. In some examples, assigning relatively more budget to early states may also lead to a, as a compromise, slight performance drop. On the other hand, allocating training budget to later stages may lead to better performance at higher training FLOPs (e.g., as shown in FIG. 5).

Figure 9:
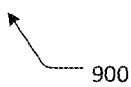
FIG. 9 illustrates example learning rate schedules for different stages, according to some aspects described herein.
Figure 10:
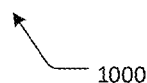
FIG. 10 illustrates example batch sizes for different stages, according to some aspects described herein.

FIG. 9 illustrates an example table 900 that includes learning rate schedules for different stages and FIG. 10 illustrates an example table 1000 that includes batch sizes for different stages. The examples of FIGS. 9 and 10 illustrate that a full cosine decay scheduler on each stage may work best for some examples provided herein, such as because for each stage a full cosine scheduler may help to model better converge. In some examples, by ablating on batch size, one may find that scaling batch size according to a number of frames used for reconstruction hinders the performance, such as because larger batch sizes may cause a model to converge to a local minima. In some examples, 16 may be used as a consistent batch size for all stages.

Figure 11:
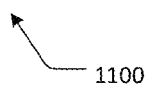
FIG. 11 illustrate example ablations on a number of stages, according to some aspects described herein.

FIG. 11 illustrates an example table 1100 of ablations on a number of stages. Specifically, the example table 1100 shows an impact of different numbers of training stages on performance. In some example ablations, training resources are uniformly distributed to each stage. In some examples, an early stage takes half-of the frames for reconstruction. It may be empirically found that increasing training stages, and with half of frames, improves performance, as well as efficiency. In some examples provided herein, the performance and efficiency gain saturates at a 4-stage training scheduler.

Figure 12:
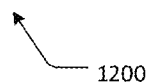
FIG. 12 illustrates example ablations on a temporal sampling strategy, according to some aspects described herein.

FIG. 12 illustrates an example table 1200 of ablations on a temporal sampling strategy. Specifically, the proposed TPL described herein is compared with a multigrid sampling strategy. In the example table 1200 of FIG. 12, long-cycle versions are implemented using the same temporal resolution (2, 4, 8, 16) as mechanisms provided herein. The rest setting is kept the same as an example default setting of mechanisms provided herein. The results of the example table 1200 show that the proposed TPL outperforms multigrid by 1%.

Generally, mechanisms provided herein may include a temporal progressive learning (TPL) framework to speed and enhance video processing, such as videoMAEs. Mechanisms provided herein also include a progressive learning strategy by separating learning processes from a informative-dense while low-cost spatio training to a more costly temporal training. Specifically, mechanisms provided herein may start videoMAE training with a single frame for spatial semantics learning. Then mechanisms provided herein may progressively increase a clip temporal length at each training stage, such as until a model learns a full spatio-temporal representation. Different design choices may be ablated to generate a simple but effective training recipe. With extensive experiments conducted on K400 and SSV2, mechanisms provided herein show advantageous performance, while only requiring 2× epochs. Furthermore, with a same amount of computational resources, mechanisms provided herein achieve 85.5% and 74.7% accuracy on conventional models, such as K400 and SS-V2, respectively, by using a high-capacity ViT-H model.

It is noted that while mechanisms provided herein have been described with respect to video MAE, it should be recognized that techniques for temporal progressive learning described herein may be used for other types of video processing, such as video segmentation, video classification, or the like that may be recognized by those or ordinary skill in the art.

Figure 13:
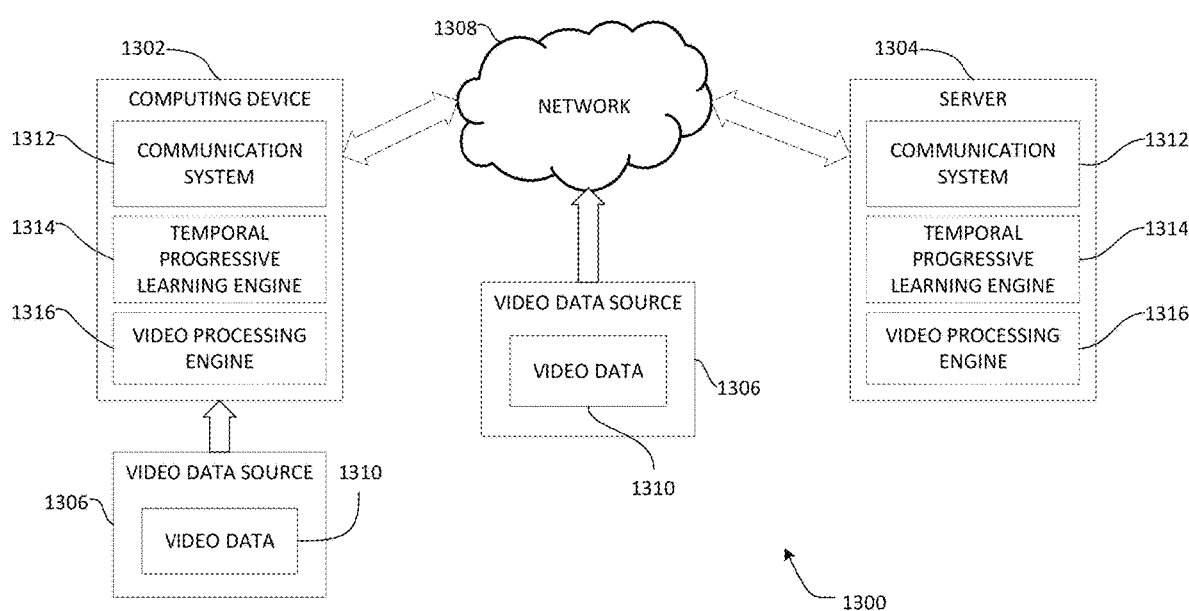
FIG. 13 illustrates an overview of an example system according to some aspects described herein.

FIG. 13 shows an example of a system 1300 for performing temporal progressive learning for video processing, in accordance with some aspects of the disclosed subject matter. The system 1300 includes one or more computing devices 1302, one or more servers 1304, a video data source 1306, and a communication network or network 1308. The computing device 1302 can receive video data 1310 from the video data source 1306, which may be, for example a visual sensor, a camera, a computer-executed program that generates video data, and/or memory with data stored therein that corresponds to video data. Additionally, or alternatively, the network 1308 can receive video data 1310 from the video data source 1306, which may be, for example a visual sensor, a camera, a computer-executed program that generates video data, and/or memory with data stored therein that corresponds to video data.

Computing device 1302 may include a communication system 1312, a temporal progressive learning engine or component 1314, and a video processing engine or component 1316. In some examples, computing device 1302 can execute at least a portion of temporal progressive learning component 1314 to train a model to reconstruct video frames. Further, in some example, computing device 1302 can execute at least a portion of video processing component 1316 to process video data containing a plurality of image frames.

Server 1304 may include a communication system 1312, a temporal progressive learning engine or component 1314, and a video processing engine or component 1316. In some examples, server 1304 can execute at least a portion of temporal progressive learning component 1314 to train a model to reconstruct video frames. Further, in some example, server 1304 can execute at least a portion of video processing component 1316 to process video data containing a plurality of image frames.

Additionally, or alternatively, in some examples, computing device 1302 can communicate data received from video data source 1306 to the server 1304 over a communication network 1308, which can execute at least a portion of temporal progressive learning component 1314 and/or video processing component 1316. In some examples, temporal progressive learning component 1314 and/or video processing component 1316 may execute one or more portions of method/process 1400, described below in connection with FIG. 14.

In some examples, computing device 1302 and/or server 1304 can be any suitable computing device or combination of devices that may be used by a requestor, such as a desktop computer, a laptop computer, a smartphone, a tablet computer, a wearable computer, a server computer, a virtual machine being executed by a physical computing device, a web server, etc. Further, in some examples, there may be a plurality of computing device 1302 and/or a plurality of servers 1304.

In some examples, video data source 1306 can be any suitable source of video data (e.g., video data generated from a computing device, video data received from a camera, etc.) In a more particular example, video data source 1306 can include memory storing video data (e.g., local memory of computing device 1302, local memory of server 1304, cloud storage, portable memory connected to computing device 1302, portable memory connected to server 1304, etc.).

In another more particular example, video data source 1306 can include an application configured to generate video data. In some examples, video data source 1306 can be local to computing device 1302. Additionally, or alternatively, video data source 1306 can be remote from computing device 1302 and can communicate video data 110 to computing device 1302 (and/or server 1304) via a communication network (e.g., communication network 1308).

In some examples, communication network 1308 can be any suitable communication network or combination of communication networks. For example, communication network 1308 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some examples, communication network 1308 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 13 can each be any suitable communications link or combination of communication links, such as wired links, fiber optics links, Wi-Fi links, Bluetooth links, cellular links, etc.

Figure 14:
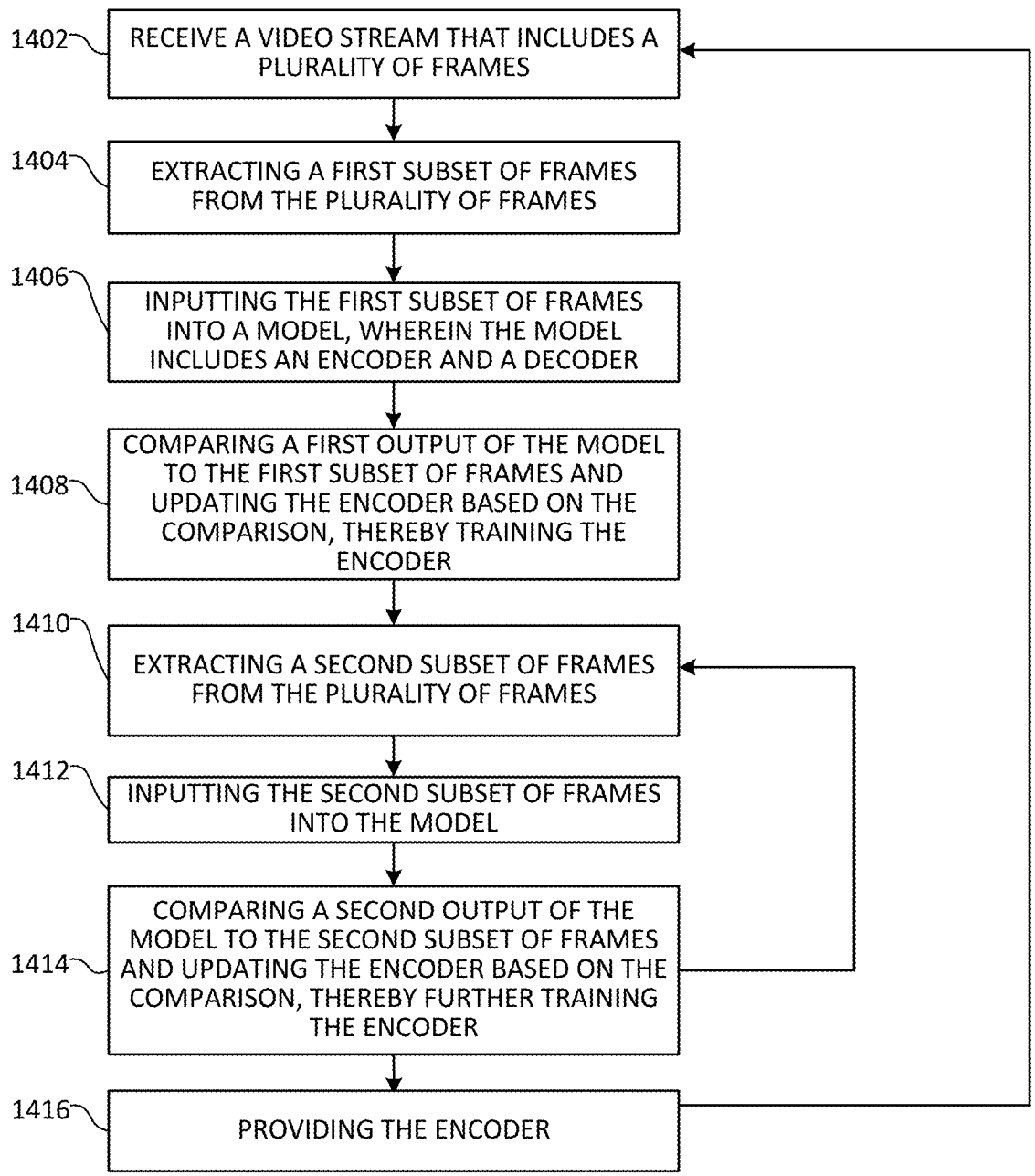
FIG. 14 illustrates an example method of according to some aspects described herein.

FIG. 14 illustrates an example method 1400 of performing temporal progressive learning (TPL). For example, the TPL may be performed for video processing, such as training a masked auto encoder (MAE) model, training a video classification model, training a video segmentation model, etc. In examples, aspects of method 1400 are performed by a device, such as computing device 1302 and/or server 1304, discussed above with respect to FIG. 13.

Method 1400 begins at operation 1402 where a video stream is received. The video stream includes a plurality of frames. For example, each frame may be a still image that collectively form the video stream. The plurality of frames may be collected at a regular and/or irregular interval of time (e.g., an interval of time measured in milliseconds). The video stream may include video data, such as video data 1310 (see FIG. 13), and may be received from a video data source, such as video data source 1306 (see FIG. 13).

At operation 1404, a first subset of frames is extracted from the plurality of frames. In some examples, each frame in the first subset of frames is randomly masked. For example, each frame may include a plurality of tubes and the masking may cause each frame of the first subset of frames to include a subset of the plurality of tubes.

At operation 1406, the first subset of frames is input into a model. The model includes an encoder and a decoder. In some examples, the model is a masked auto encoder (MAE) model, such as a video MAE model. Further, the first subset of frames may be randomly selected from the plurality of frames. For example, each frame of the plurality of frames may correspond to a unit of time and/or a time stamp. The first subset of frames may include frames that correspond to a random selection of the units of time and/or time stamps.

At operation 1408, a first output of the model is compared to the first subset of frames. Further, the encoder of the model is updated based on the comparison, thereby causing the encoder to be trained. For example, an error may be determined between the first subset of frames and first output of the mode. The encoder may be updated based on the error. The error may be determined based on local error specific to tubes and/or pixels of the first output, with respect to the first subset of frames. Additionally and/or alternatively, the error may be determined based on global error of the first output with respect to the first subset of frames.

At operation 1410, a second subset of frames is extracted from the plurality of frames. The second subset of frames includes a number of frames that is larger than a number of frames in the first subset of frames. In some examples, the second subset of frames includes twice as many frames as the first subset of frames. For example, if the first subset of frames includes 2 frames, then the second subset of frames may include 4 frames. Additional and/or alternative multipliers of frames may be recognized by those of ordinary skill in the art, at least in light of teachings provided herein.

In some examples, each frame in the second subset of frames is randomly masked. For example, each frame may include a plurality of tubes and the masking may cause each frame of the second subset of frames to include a subset of the plurality of tubes. Further, the second subset of frames may be randomly selected from the plurality of frames. For example, each frame of the plurality of frames may correspond to a unit of time and/or a time stamp. The second subset of frames may include frames that correspond to a random selection of the units of time and/or time stamps.

At operation 1412, the second subset of frames is input into the model. The second subset of frames may be input into the model to further train the encoder which has already been at least partially trained by the first subset of frames and corresponding first output from the model.

At operation 1414, a second output of the model is compared to the second subset of the frames. Further, the encoder is updated based on the comparison, thereby further training the encoder. For example, an error may be determined between the second subset of frames and second output of the mode. The encoder may be updated based on the error. The error may be determined based on local error specific to tubes and/or pixels of the second output, with respect to the second subset of frames. Additionally and/or alternatively, the error may be determined based on global error of the second output with respect to the second subset of frames.

In some examples, operations 1410-1414 are repeated, such as with a third subset of frames from the plurality of frames, a fourth subset of frames from the plurality of frames, etc. Therefore, a corresponding third output, fourth output, etc., may be received from the model and used to further train the encoder. For example, a third subset of frames may be extracted from the third plurality of frames. The third subset of frames may be randomly selected from the plurality of frames and include a number of frames that is larger than the number of frames in the second subset of frames (e.g., twice as many frames as the second subset of frames). The third subset of frames may be input into the model to generate a third output. The third output may be compared to the third subset of frames. The encoder may be updated based on the comparison, thereby further training the encoder.

In some examples, each sequence of extracting, inputting, and comparing define a respective stage. For example operations 1404, 1406, and 1408 may define a first stage. Further, a first iteration of operations 1410, 1412, and 1414 may define a second stage. Subsequent iterations of operations 1410, 1412, and 1414 (e.g., extracting a third subset of frames . . . ) may define subsequent stages.

The number of frames extracted in the subset of frames for each stage may be determined based on a total number of stages and a computational budget. For example, optimization techniques described earlier herein may be implemented to efficiently implement temporal progressive learning based on one or more of a predetermined computational budget, a total number of stages, and/or a number of frames extracted at each stage. The predetermined computational budget may be specified by a user and/or dependent on computational resources available for a computing device on which methods disclosed herein are implemented.

At operation 1416, the encoder is provided as an output. In some examples, the encoder may be provided with the model. For example, the encoder and/or model which are trained can be provided to be used for subsequent video processing techniques. Additionally, and/or alternatively, the encoder and/or model can be provided for further training techniques to be performed thereon. Additional and/or alternative uses for the encoder that was trained using temporal progressive learning techniques provided herein may be recognized by those of ordinary skill in the art.

Method 1400 may terminate at operation 1416. Alternatively, method 1400 may return to operation 1402 to provide an iterative loop of receiving a video stream that includes a plurality of frames, training an encoder, and providing the encoder as an output.

Figure 15:
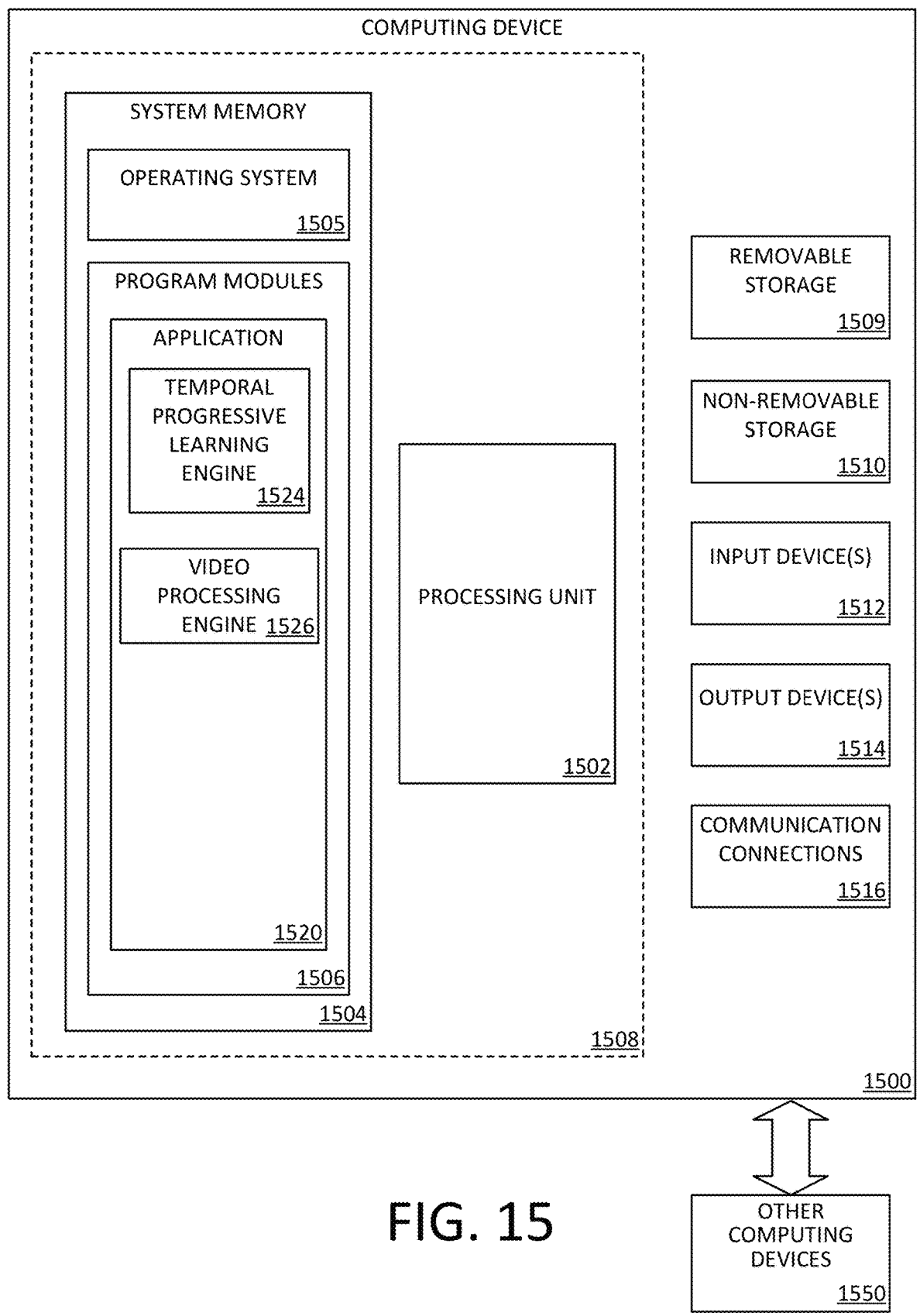
FIG. 15 is a block diagram illustrating example physical components of a computing device with which aspects of the disclosure may be practiced.

FIGS. 15-18 and the associated descriptions provide a discussion of a variety of operating environments in which aspects of the disclosure may be practiced. However, the devices and systems illustrated and discussed with respect to FIGS. 15-11 are for purposes of example and illustration and are not limiting of a vast number of computing device configurations that may be utilized for practicing aspects of the disclosure, described herein.

FIG. 15 is a block diagram illustrating physical components (e.g., hardware) of a computing device 1500 with which aspects of the disclosure may be practiced. The computing device components described below may be suitable for the computing devices described above, including computing device 1302 in FIG. 13. In a basic configuration, the computing device 1500 may include at least one processing unit 1502 and a system memory 1504. Depending on the configuration and type of computing device, the system memory 1504 may comprise, but is not limited to, volatile storage (e.g., random access memory), non-volatile storage (e.g., read-only memory), flash memory, or any combination of such memories.

The system memory 1504 may include an operating system 1505 and one or more program modules 1506 suitable for running software application 1520, such as one or more components supported by the systems described herein. As examples, system memory 1504 may store temporal progressive learning engine or component 1524, and video processing engine or component 1526. The operating system 1505, for example, may be suitable for controlling the operation of the computing device 1500.

Furthermore, aspects of the disclosure may be practiced in conjunction with a graphics library, other operating systems, or any other application program and is not limited to any particular application or system. This basic configuration is illustrated in FIG. 15 by those components within a dashed line 1508. The computing device 1500 may have additional features or functionality. For example, the computing device 1500 may also include additional data storage devices (removable and/or non-removable) such as, for example, magnetic disks, optical disks, or tape. Such additional storage is illustrated in FIG. 15 by a removable storage device 1509 and a non-removable storage device 1510.

As stated above, a number of program modules and data files may be stored in the system memory 1504. While executing on the processing unit 1502, the program modules 1506 (e.g., application 1520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 15 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1500 on the single integrated circuit (chip). Some aspects of the disclosure may also be practiced using other technologies capable of performing logical operations such as, for example, AND, OR, and NOT, including but not limited to mechanical, optical, fluidic, and quantum technologies. In addition, some aspects of the disclosure may be practiced within a general purpose computer or in any other circuits or systems.

The computing device 1500 may also have one or more input device(s) 1512 such as a keyboard, a mouse, a pen, a sound or voice input device, a touch or swipe input device, etc. The output device(s) 1514 such as a display, speakers, a printer, etc. may also be included. The aforementioned devices are examples and others may be used. The computing device 1500 may include one or more communication connections 1516 allowing communications with other computing devices 1550. Examples of suitable communication connections 1516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1504, the removable storage device 1509, and the non-removable storage device 1510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1500. Any such computer storage media may be part of the computing device 1500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 16A:
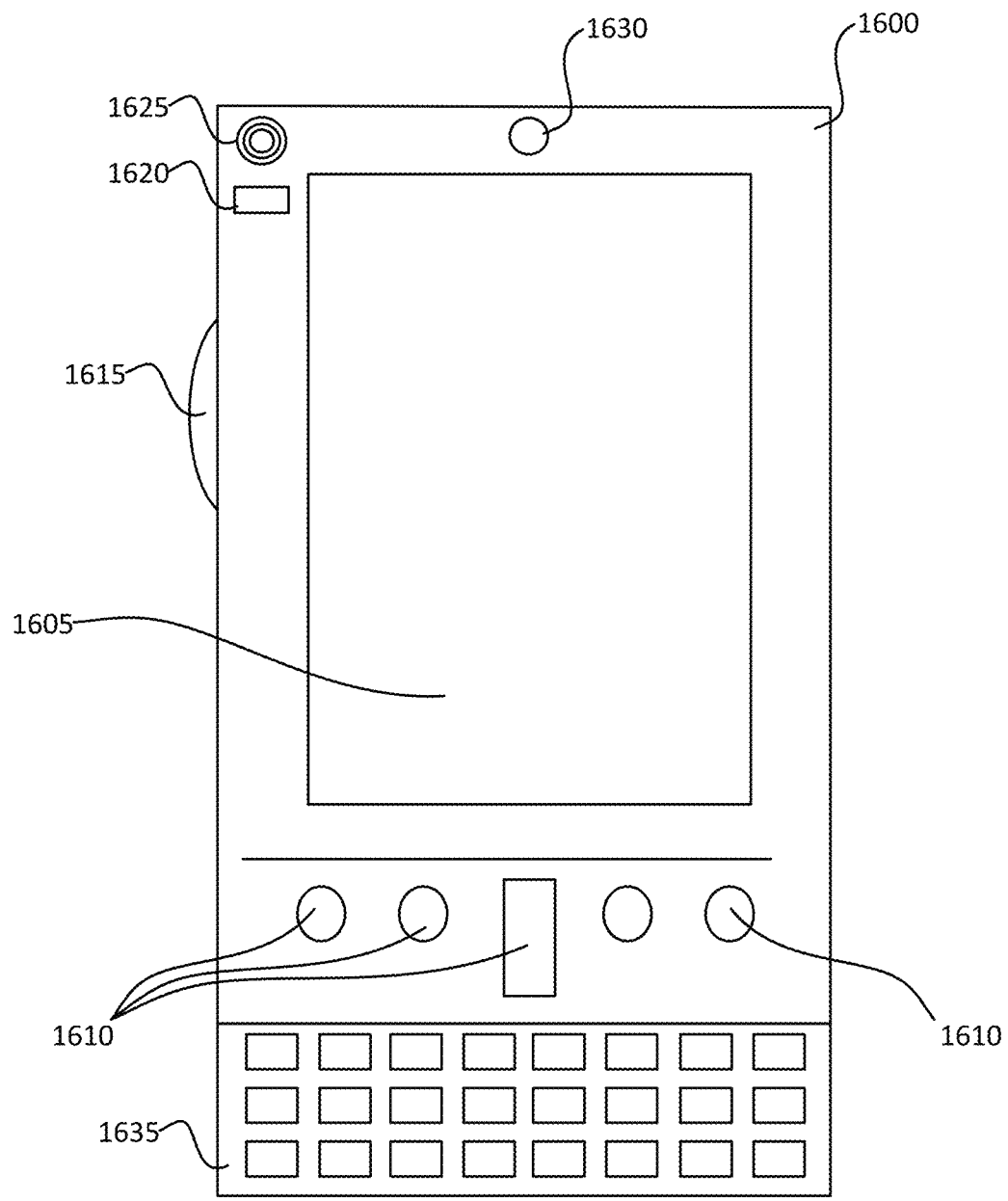
FIGS. 16A and 16B are simplified block diagrams of a mobile computing device with which aspects of the present disclosure may be practiced.
Figure 16B:
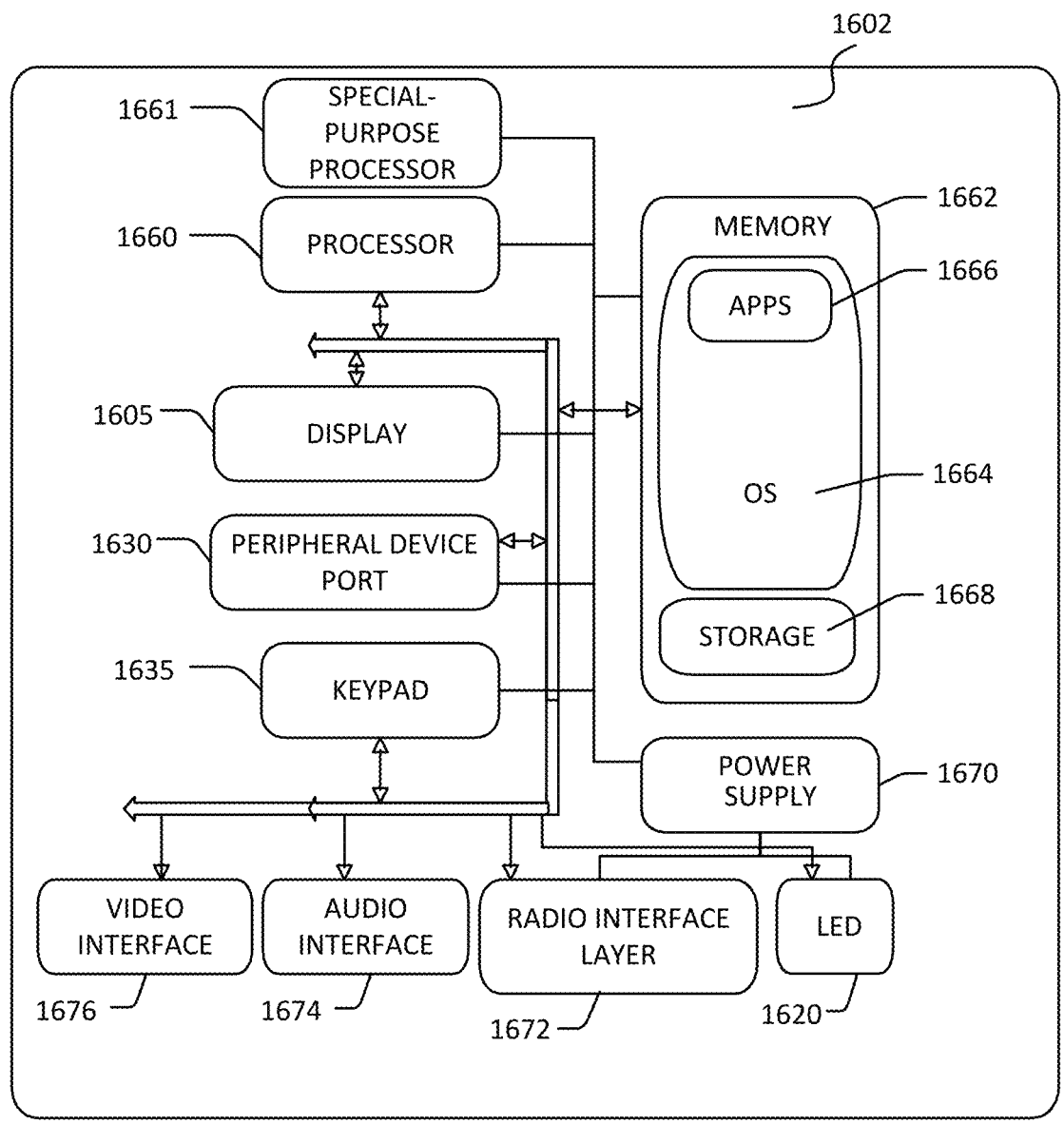

FIGS. 16A and 16B illustrate a mobile computing device 1600, for example, a mobile telephone, a smart phone, wearable computer (such as a smart watch), a tablet computer, a laptop computer, and the like, with which some aspects of the disclosure may be practiced. In some aspects, the client may be a mobile computing device. With reference to FIG. 16A, one aspect of a mobile computing device 1600 for implementing the aspects is illustrated. In a basic configuration, the mobile computing device 1600 is a handheld computer having both input elements and output elements. The mobile computing device 1600 typically includes a display 1605 and one or more input buttons 1610 that allow the user to enter information into the mobile computing device 1600. The display 1605 of the mobile computing device 1600 may also function as an input device (e.g., a touch screen display).

If included, an optional side input element 1615 allows further user input. The side input element 1615 may be a rotary switch, a button, or any other type of manual input element. In alternative aspects, mobile computing device 1600 may incorporate more or less input elements. For example, the display 1605 may not be a touch screen in some examples.

In yet another alternative example, the mobile computing device 1600 is a portable phone system, such as a cellular phone. The mobile computing device 1600 may also include an optional keypad 1635. Optional keypad 1635 may be a physical keypad or a "soft" keypad generated on the touch screen display.

In various examples, the output elements include the display 1605 for showing a graphical user interface (GUI), a visual indicator 1620 (e.g., a light emitting diode), and/or an audio transducer 1625 (e.g., a speaker). In some aspects, the mobile computing device 1600 incorporates a vibration transducer for providing the user with tactile feedback. In yet another aspect, the mobile computing device 1600 incorporates input and/or output ports, such as an audio input (e.g., a microphone jack), an audio output (e.g., a headphone jack), and a video output (e.g., a HDMI port) for sending signals to or receiving signals from an external device.

FIG. 16B is a block diagram illustrating the architecture of one aspect of a mobile computing device. That is, the mobile computing device 1600 can incorporate a system (e.g., an architecture) 1602 to implement some aspects. In some examples, the system 1602 is implemented as a "smart phone" capable of running one or more applications (e.g., browser, e-mail, calendaring, contact managers, messaging clients, games, and media clients/players). In some aspects, the system 1602 is integrated as a computing device, such as an integrated personal digital assistant (PDA) and wireless phone.

One or more application programs 1666 may be loaded into the memory 1662 and run on or in association with the operating system 1664. Examples of the application programs include phone dialer programs, e-mail programs, personal information management (PIM) programs, word processing programs, spreadsheet programs, Internet browser programs, messaging programs, and so forth. The system 1602 also includes a non-volatile storage area 1668 within the memory 1662. The non-volatile storage area 1668 may be used to store persistent information that should not be lost if the system 1602 is powered down. The application programs 1666 may use and store information in the non-volatile storage area 1668, such as e-mail or other messages used by an e-mail application, and the like. A synchronization application (not shown) also resides on the system 1602 and is programmed to interact with a corresponding synchronization application resident on a host computer to keep the information stored in the non-volatile storage area 1668 synchronized with corresponding information stored at the host computer. As should be appreciated, other applications may be loaded into the memory 1662 and run on the mobile computing device 1600 described herein (e.g., a task management engine, communication generation engine, etc.).

The system 1602 has a power supply 1670, which may be implemented as one or more batteries. The power supply 1670 might further include an external power source, such as an AC adapter or a powered docking cradle that supplements or recharges the batteries.

The system 1602 may also include a radio interface layer 1672 that performs the function of transmitting and receiving radio frequency communications. The radio interface layer 1672 facilitates wireless connectivity between the system 1602 and the "outside world," via a communications carrier or service provider. Transmissions to and from the radio interface layer 1672 are conducted under control of the operating system 1664. In other words, communications received by the radio interface layer 1672 may be disseminated to the application programs 1666 via the operating system 1664, and vice versa.

The visual indicator 1620 may be used to provide visual notifications, and/or an audio interface 1674 may be used for producing audible notifications via the audio transducer 1625. In the illustrated example, the visual indicator 1620 is a light emitting diode (LED) and the audio transducer 1625 is a speaker. These devices may be directly coupled to the power supply 1670 so that when activated, they remain on for a duration dictated by the notification mechanism even though the processor 1660 and/or special-purpose processor 1661 and other components might shut down for conserving battery power. The LED may be programmed to remain on indefinitely until the user takes action to indicate the powered-on status of the device. The audio interface 1674 is used to provide audible signals to and receive audible signals from the user. For example, in addition to being coupled to the audio transducer 1625, the audio interface 1674 may also be coupled to a microphone to receive audible input, such as to facilitate a telephone conversation. In accordance with aspects of the present disclosure, the microphone may also serve as an audio sensor to facilitate control of notifications, as will be described below. The system 1602 may further include a video interface 1676 that enables an operation of an on-board camera 1630 to record still images, video stream, and the like.

A mobile computing device 1600 implementing the system 1602 may have additional features or functionality. For example, the mobile computing device 1600 may also include additional data storage devices (removable and/or non-removable) such as, magnetic disks, optical disks, or tape. Such additional storage is illustrated in FIG. 16B by the non-volatile storage area 1668.

Data/information generated or captured by the mobile computing device 1600 and stored via the system 1602 may be stored locally on the mobile computing device 1600, as described above, or the data may be stored on any number of storage media that may be accessed by the device via the radio interface layer 1672 or via a wired connection between the mobile computing device 1600 and a separate computing device associated with the mobile computing device 1600, for example, a server computer in a distributed computing network, such as the Internet. As should be appreciated such data/information may be accessed via the mobile computing device 1600 via the radio interface layer 1672 or via a distributed computing network. Similarly, such data/information may be readily transferred between computing devices for storage and use according to well-known data/information transfer and storage means, including electronic mail and collaborative data/information sharing systems.

Figure 17:
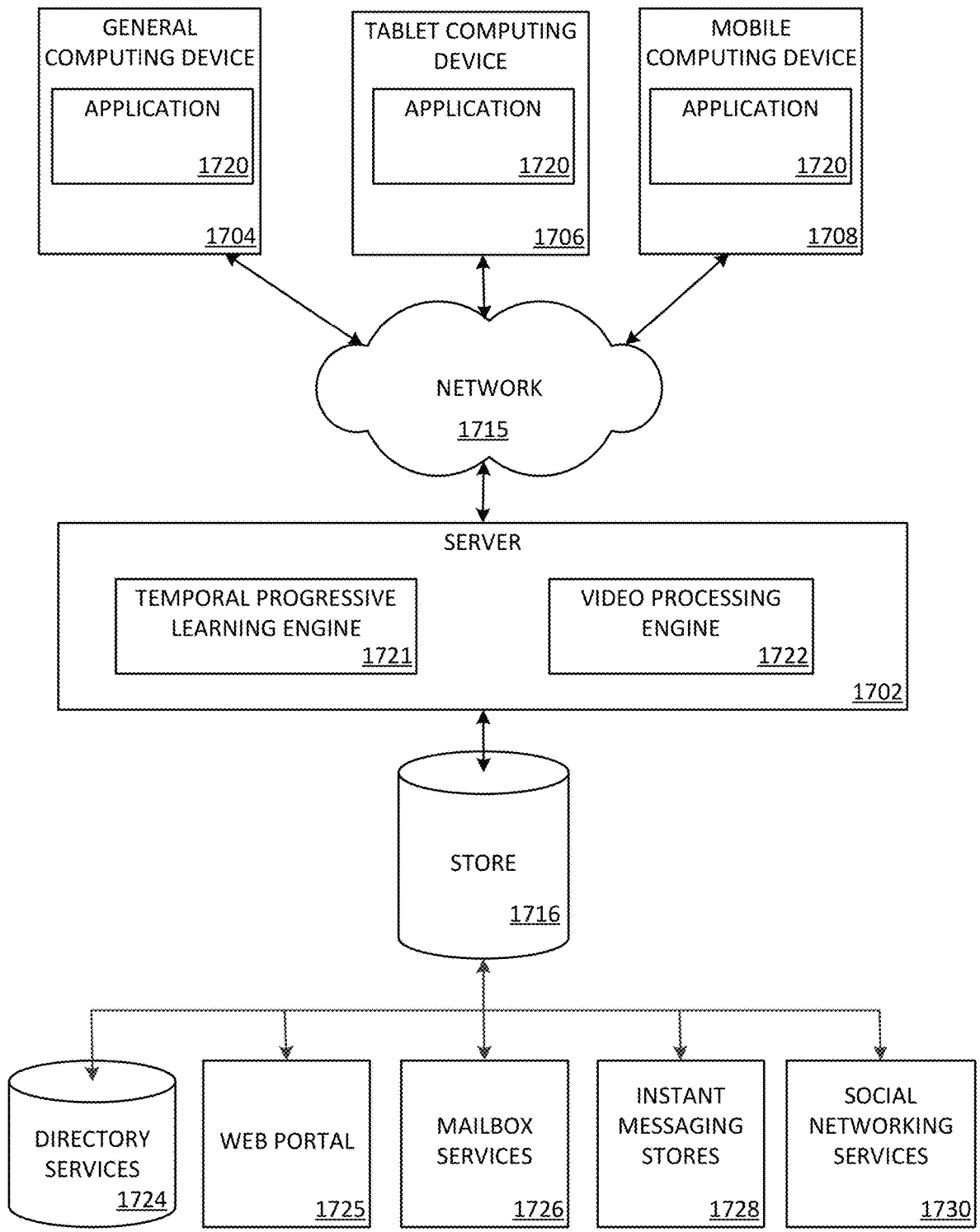
FIG. 17 is a simplified block diagram of a distributed computing system in which aspects of the present disclosure may be practiced.

FIG. 17 illustrates one aspect of the architecture of a system for processing data received at a computing system from a remote source, such as a personal computer 1704, tablet computing device 1706, or mobile computing device 1708, as described above. Content displayed at server device 1702 may be stored in different communication channels or other storage types. For example, various documents may be stored using a directory service 1724, a web portal 1725, a mailbox service 1726, an instant messaging store 1728, or a social networking site 1730.

A vocal analysis engine or component 1720 may be employed by a client that communicates with server device 1702. Additionally, or alternatively, temporal progressive learning engine or component 1721, and/or video processing engine or component 1722 may be employed by server device 1702. The server device 1702 may provide data to and from a client computing device such as a personal computer 1704, a tablet computing device 1706 and/or a mobile computing device 1708 (e.g., a smart phone) through a network 1715. By way of example, the computer system described above may be embodied in a personal computer 1704, a tablet computing device 1706 and/or a mobile computing device 1708 (e.g., a smart phone). Any of these examples of the computing devices may obtain content from the store 1716, in addition to receiving graphical data useable to be either pre-processed at a graphic-originating system, or post-processed at a receiving computing system.

Figure 18:
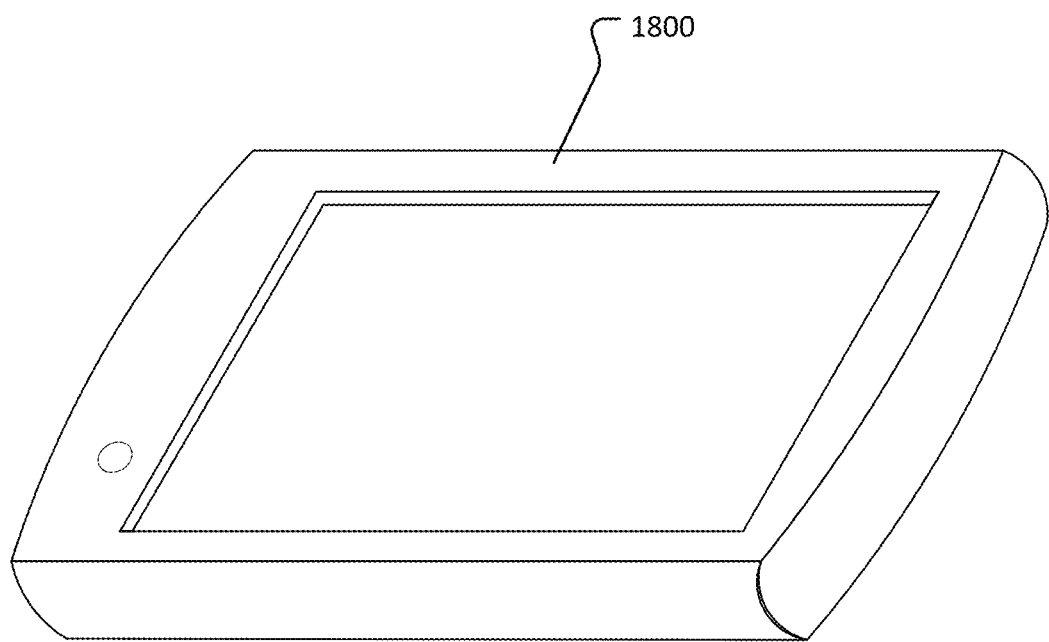
FIG. 18 illustrates a tablet computing device for executing one or more aspects of the present disclosure.

FIG. 18 illustrates an exemplary tablet computing device 1800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the present disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method of performing temporal progressive learning for video processing, the method comprising:
receiving a video stream comprising a plurality of frames;

extracting a first subset of frames from the plurality of frames;

inputting the first subset of frames into a model, wherein the model includes an encoder and a decoder;

comparing a first output of the model to the first subset of frames and updating the encoder based on the comparison, thereby training the encoder;

extracting a second subset of frames from the plurality of frames, the second subset of frames comprising a number of frames that is larger than a number of frames in the first subset of frames;

inputting the second subset of frames into the model;

comparing a second output of the model to the second subset of frames and updating the encoder based on the comparison, thereby further training the encoder; and providing the encoder.

2. The method of claim 1, wherein the model is a masked auto encoder (MAE) model.

3. The method of claim 2, wherein each frame in the first and second subsets of frames are randomly masked, prior to being input into the MAE model.

4. The method of claim 1, wherein the first and second subsets of frames are randomly selected from the plurality of frames.

5. The method of claim 1, wherein the second subset of frames comprises twice as many frames as the first subset of frames.

6. The method of claim 1, further comprising, prior to providing the model:

extracting a third subset of frames from the plurality of frames, the third subset of frames being randomly selected from the plurality of frames and comprising a number of frames that is larger than the number of frames in the second subset of frames;

inputting the third subset of frames into the model; and comparing a third output of the model to the third subset of frames and updating the encoder based on the comparison, thereby further training the encoder.

7. The method of claim 6, wherein the third subset of frames comprises twice as many frames as the second subset of frames.

8. The method of claim 1, wherein each sequence of the extracting, the inputting, and the comparing define a respective stage, and wherein the number of frames extracted in the subset of frames for each stage are determined based on a total number of stages and a computational budget.

9. A system for performing temporal progressive learning for video processing, the system comprising:

a processor;

memory storing instructions that, when executed by the processor, cause the system to perform a set of operations, the set of operations comprising:

receiving a video stream comprising a plurality of frames;

extracting a first subset of frames from the plurality of frames;

inputting the first subset of frames into a model, wherein the model includes an encoder and a decoder;

comparing a first output of the model to the first subset of frames and updating the encoder based on the comparison, thereby training the encoder;

extracting a second subset of frames from the plurality of frames, the second subset of frames comprising a number of frames that is larger than a number of frames in the first subset of frames;

inputting the second subset of frames into the model;

comparing a second output of the model to the second subset of frames and updating the encoder based on the comparison, thereby further training the encoder; and providing the encoder.

10. The system of claim 9, wherein the model is a masked auto encoder (MAE) model.

11. The system of claim 10, wherein each frame in the first and second subsets of frames are randomly masked, prior to being input into the MAE model.

12. The system of claim 9, wherein the first and second subsets of frames are randomly selected from the plurality of frames.

13. The system of claim 9, wherein the second subset of frames comprises twice as many frames as the first subset of frames.

14. The system of claim 9, further comprising, prior to providing the model:

extracting a third subset of frames from the plurality of frames, the third subset of frames being randomly selected from the plurality of frames and comprising a number of frames that is larger than the number of frames in the second subset of frames;

inputting the third subset of frames into the model; and comparing a third output of the model to the third subset of frames and updating the encoder based on the comparison, thereby further training the encoder.

15. The system of claim 14, wherein the third subset of frames comprises twice as many frames as the second subset of frames.

16. The system of claim 9, wherein each sequence of the extracting, the inputting, and the comparing define a respective stage, and wherein the number of frames extracted in the subset of frames for each stage are determined based on a total number of stages and a computational budget.

17. One or more computer readable non-transitory storage media embodying software that is operable when executed, by at least one processor of a device, to:

receive a video stream comprising a plurality of frames;

extract a first subset of frames from the plurality of frames;

input the first subset of frames into a model, wherein the model includes an encoder and a decoder;

compare a first output of the model to the first subset of frames and updating the encoder based on the comparison, thereby training the encoder;

extract a second subset of frames from the plurality of frames, the second subset of frames comprising a number of frames that is larger than a number of frames in the first subset of frames;

input the second subset of frames into the model;

compare a second output of the model to the second subset of frames and updating the encoder based on the comparison, thereby further training the encoder; and provide the encoder.

18. The one or more computer readable non-transitory storage media of claim 17, wherein the model is a masked auto encoder (MAE) model.

19. The one or more computer readable non-transitory storage media of claim 18, wherein each frame in the first and second subsets of frames are randomly masked, prior to being input into the MAE model.

20. The one or more computer readable non-transitory storage media of claim 17, wherein the first and second subsets of frames are randomly selected from the plurality of frames.

* * * * *